INVENTOR
John Fernandez

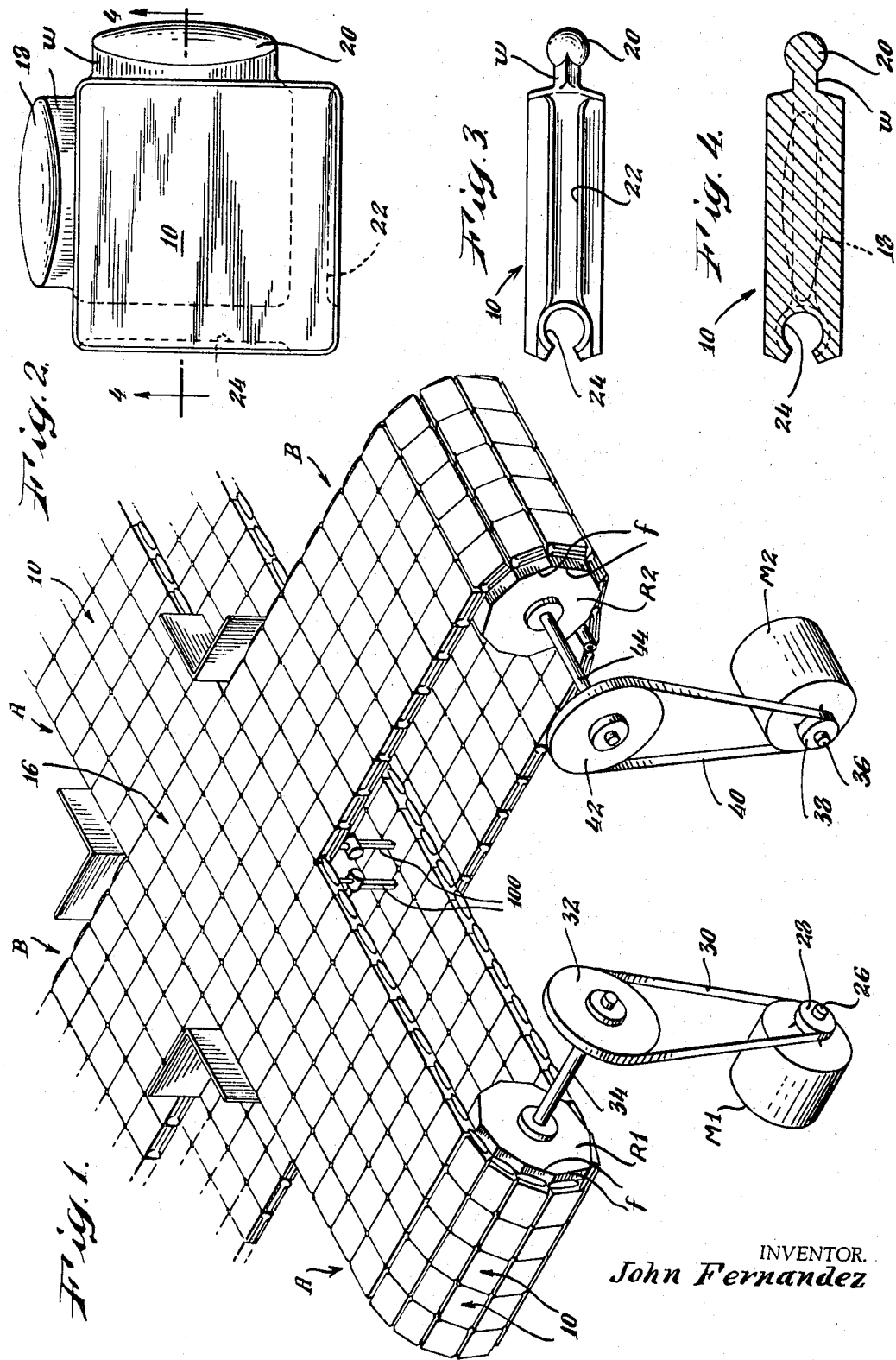

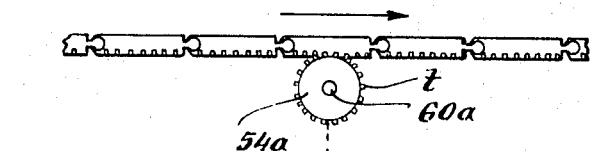
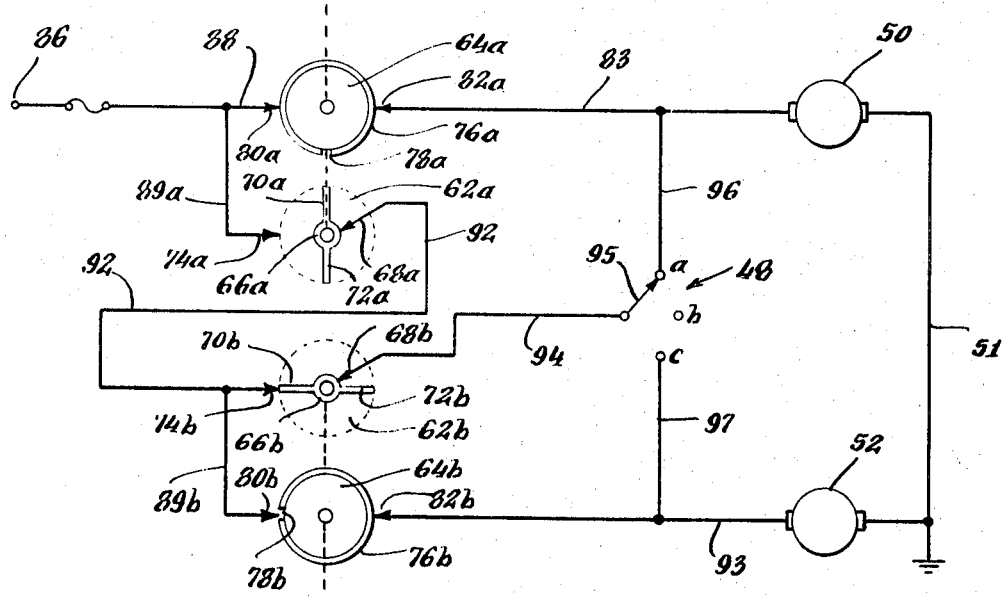
Fig. 5.
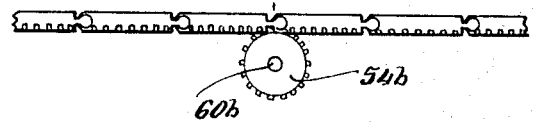
Fig. 6.
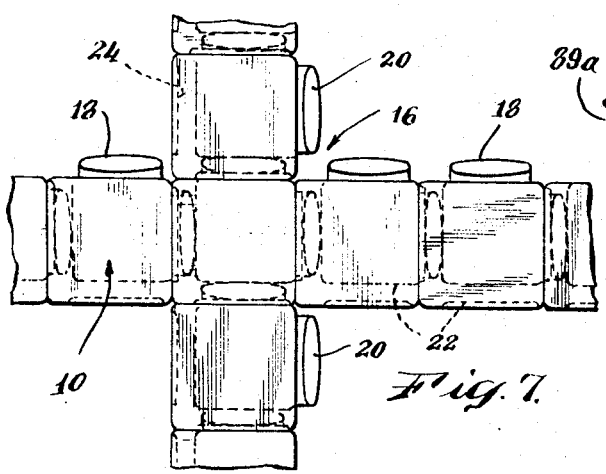
Fig. 7.
INVENTOR.
John Fernandez

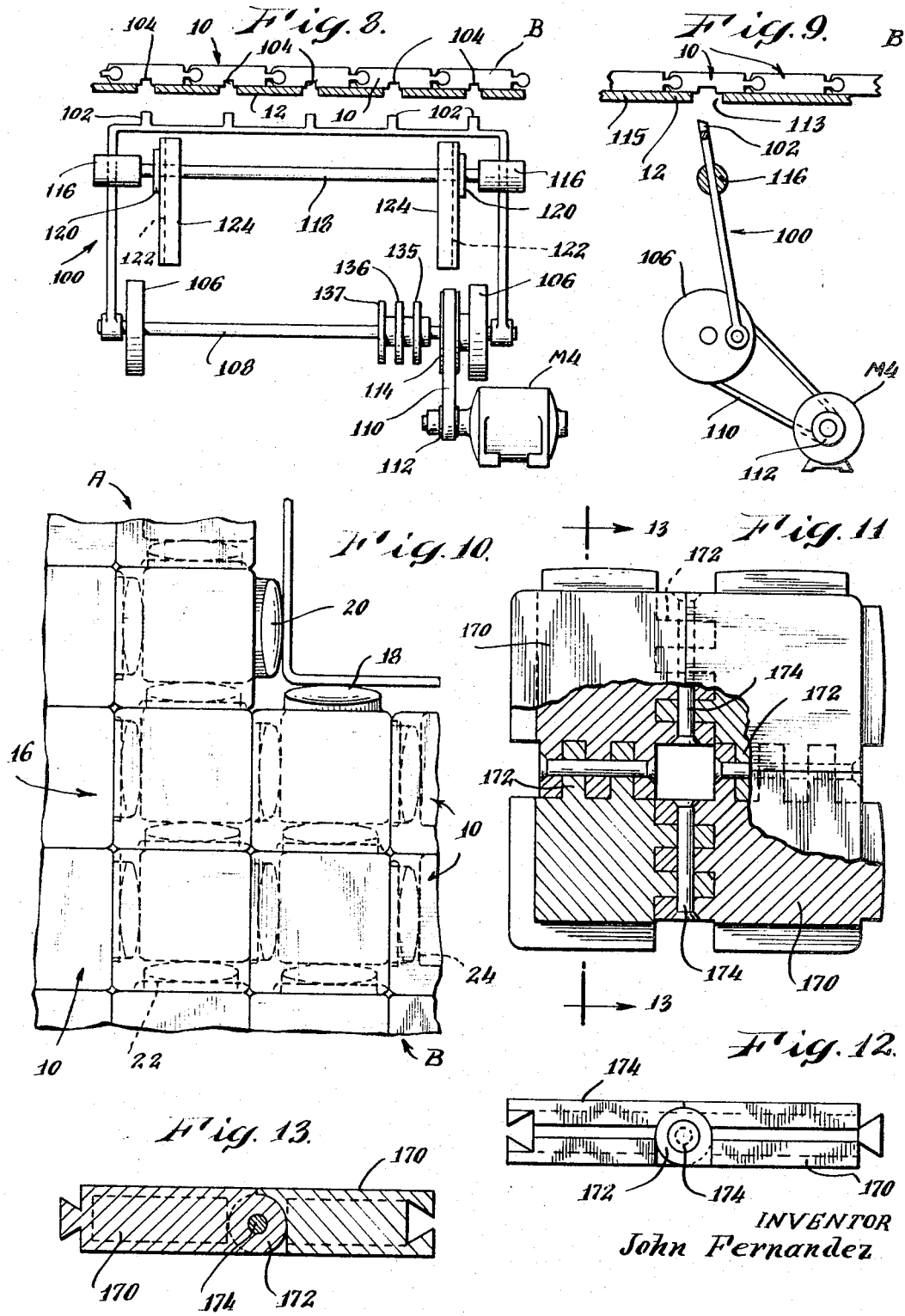

United States Patent Office 3,451,526
Patented June 24, 1969

3,451,526
CONVEYOR SYSTEMS
John Fernandez, 370 West Ave., Norwalk, Conn. 06050
Filed Mar. 3, 1967, Ser. No. 620,315
Int. Cl. B65g 37/00, 23/00
U.S. Cl. 198—75       14 Claims

ABSTRACT OF THE DISCLOSURE

A number of interengageable conveyor units or links are disposed in the form of two conveyors for movement along either of two angularly related paths having a common coplanar area of intersection, the units which at any time happen to be within said area of intersection, being common to both conveyors, and transferable from one to the other, each unit having coupling members angularly disposed around its periphery and engageable with coacting coupling members carried by the units disposed in front and behind it and at its sides, the coupling members of units which are moving becoming automatically decoupled from the coupling members of laterally opposed units which are not moving. Means are provided for controlling the movement of units along either path so that when stopped the units will be wholly within or wholly outside of said area of intersection and will not straddle the margins of the area of intersection. Means are also provided for relieving frictional engagement between adjoining units or rows of units on opposite sides of a margin of the area of intersection.

---

This invention relates to a material handling system capable of transporting articles in any one of four directions and capable in one embodiment of transporting articles first in one direction and then in another angularly related direction without transfer from one support means to another. The supporting means comprises one or more units movable in either direction along either of two angularly related paths having a coplanar area of intersection and the unit or units on which an article is being supported are themselves transferable from moving in one direction as part of one conveyor to moving in another direction as part of another conveyor. Units comprising a system of many support units are readily engageable with, and disengageable from, laterally disposed units, by movement relative to said laterally disposed units while remaining engaged with adjacent units disposed in front or behind.

Heretofore difficulty has been experienced in moving articles, particularly heavy articles, around a corner, from travelling in one direction to travelling in a second, angularly related direction. This is particularly the case when it is desirable to fasten the article conveyed to the conveyor. A plurality of conveyors have been supplied with an end of one approaching close to an end of another conveyor, or with portions offset, and in some cases disposed at different levels in overlapping relation, but even if transfer is effected the conveyed article is likely to be slewed around in the act of transfer and obviously an article fastened on its first support means would have to be released before transfer and then refastened after transfer.

It is an object of this invention to provide a method and means for facilitating the conveying of an article around a corner.

Another object of the invention is to be able to convey an article, first in one direction and then in a second, angularly related direction without having to lift the article or disturb its orientation.

Another object of the invention is to make it possible to fasten the article conveyed to a portion of a first conveyor and then to transfer it from the first conveyor to a second conveyor by transferring that portion of the first conveyor to which the article is fastened.

Another object is to provide a conveyor system having a common area of intersection from which an article may be selectively moved in either of two directions, or in any of four directions if the travel of the conveyors comprising the system is made reversible.

The invention will be best understood by reading the following description in connection with the drawings, in which FIGURE 1 is a perspective view of one embodiment of the invention, FIGURE 2 is a top plan view of one of the units comprising the system, FIGURE 3 is an end view of the unit shown in FIGURE 2, FIGURE 4 is a cross section taken on the line 4—4 of FIGURE 2, FIGURE 5 is a wiring diagram illustrating schematically means which may be used alone to control the exact position of the conveyor units relative to the area of intersection when a conveyor is stopped, and may also be used in conjunction with the control circuitry shown in FIGURE 14, FIGURE 6 is a detail view showing in perspective circuit making and breaking means comprising part of the circuitry shown in FIGURE 5, FIGURE 7 is a view of a number of conveyor units interrelated to form trains of units movable along either of two angularly related paths, each train being only one unit wide, FIGURE 8 is a side elevation, partly in section, looking longitudinally of one of the conveyors, of means projectable into engagement with the under surface of one flight of the conveyor to adjust the position of a unit or row of units comprising it, and thereby relieve tension between coupling means of said unit or row of units and coupling means of an adjoining unit or row of units.

FIGURE 9 is an end view of the structure shown in FIGURE 8.

FIGURE 10 is a detail view of the units comprising the conveyor system shown in FIGURE 1, showing the units at one corner of the area of intersection between the two conveyors, FIGURE 11 is a detail view of a modified, larger form of conveyor unit partly cut away and in horizontal section;

FIGURE 12 is an end view of the unit shown in FIGURE 11,

FIGURE 13 is a cross section taken on the line 13—13 of FIGURE 11,

Figure 14:
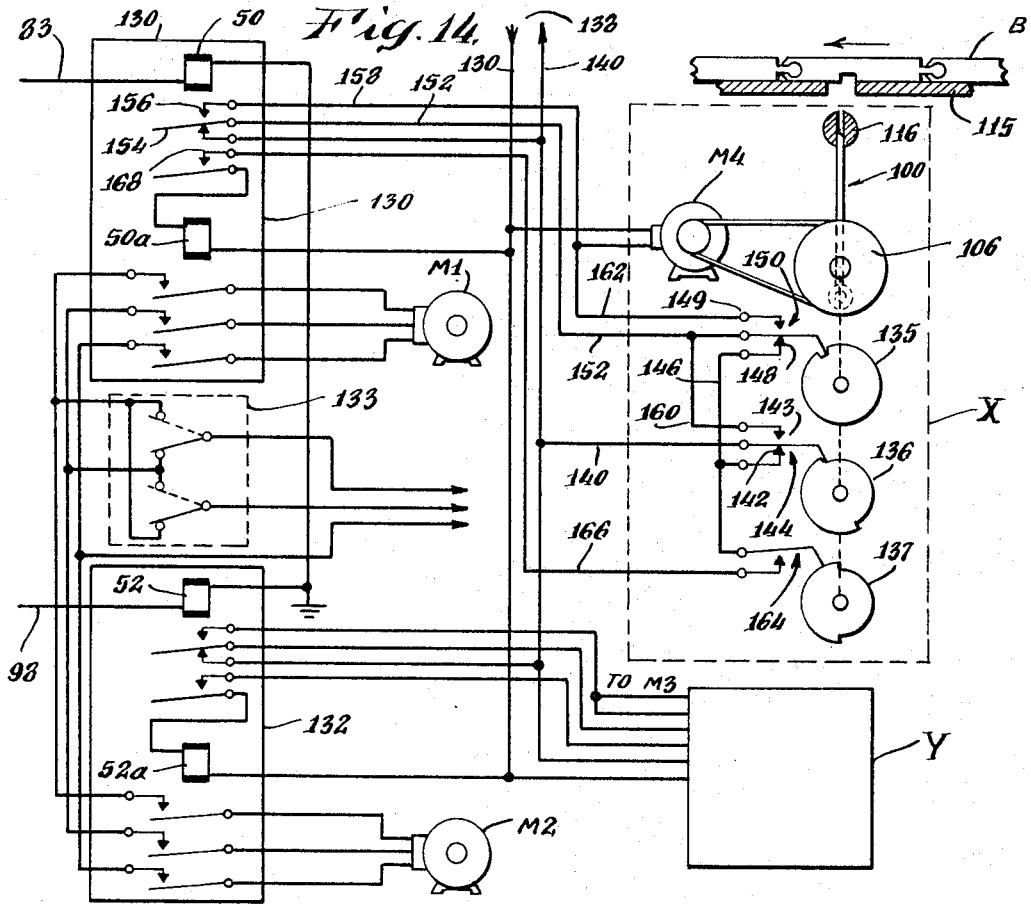
Figure 15:
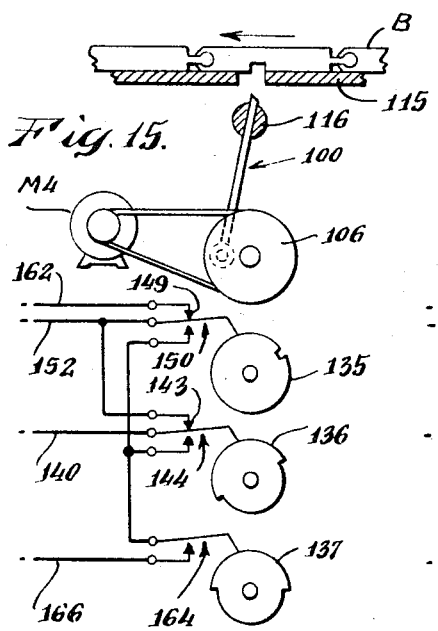
Figure 16:
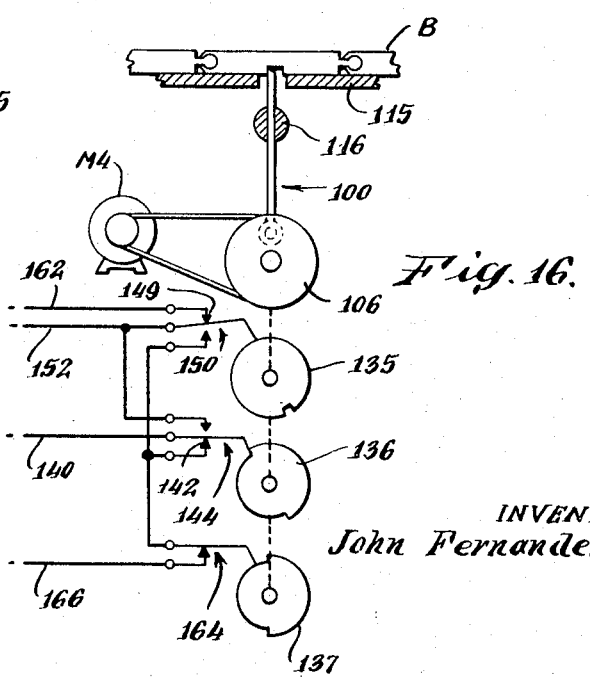
Figure 17:
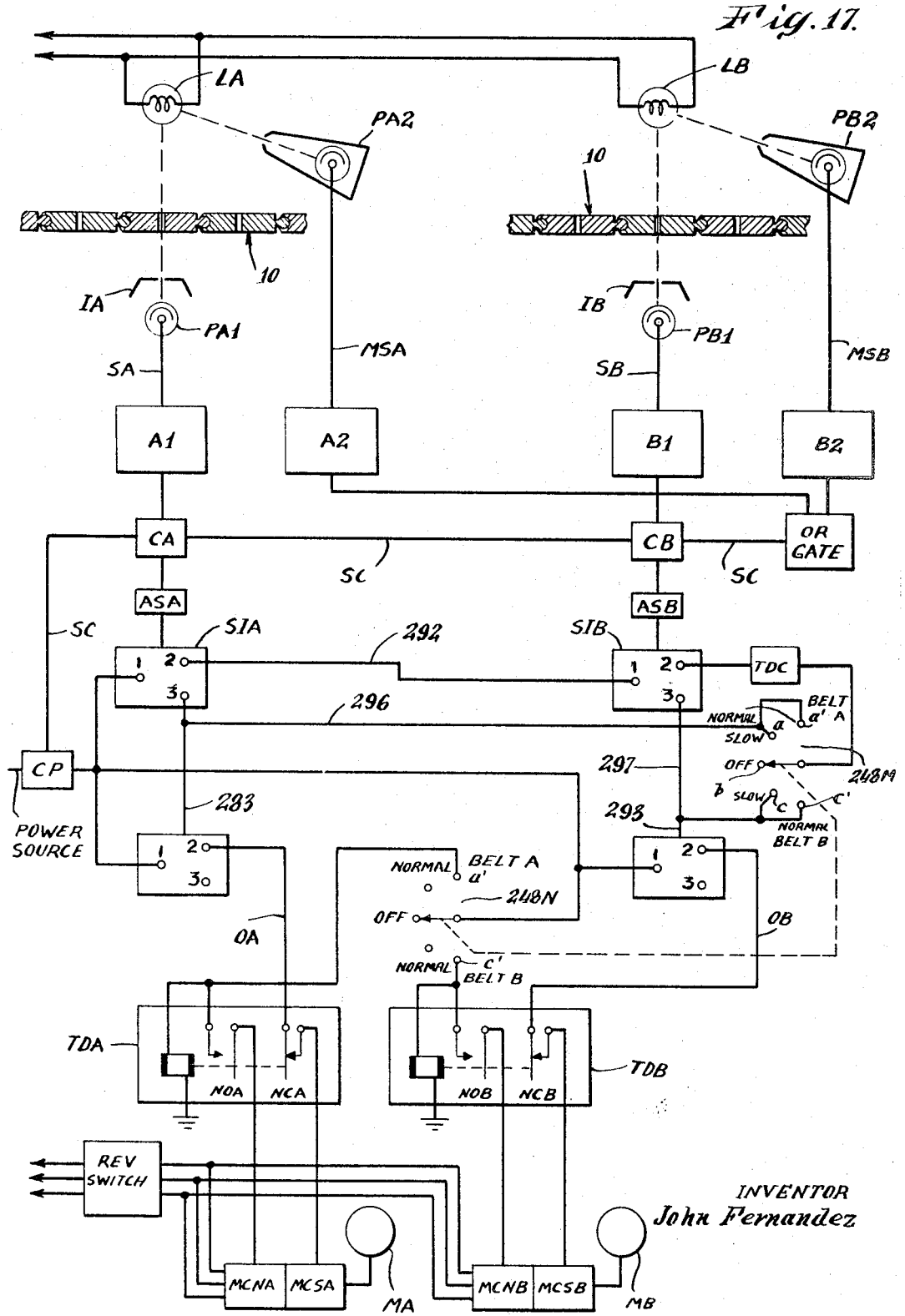

FIGURE 14 is a wiring diagram of means operative in conjunction with the control circuit shown in FIGURE 5 to actuate tension relieving means such as is shown in FIGURES 8 and 9 in timed relation to the actuation of the conveyors respectively, and includes a schematic representation of a first position of one set of three circuit operating cams which are rotated simultaneously with the crank means (forming part of each tension relieving means) actuated by alternatively operable motors M-3 and M-4 (not shown) respectively, FIGURE 15 is a view similar to the portion of FIGURE 14 showing the second operating position of the set of cams, which control the delay in the starting of motor M-1 of conveyor A and the operation during said delay of tension relieving means associated with conveyor B, FIGURE 16 is a view similar to FIGURE 15, showing the timing cams in a third position in which the motor M-4 (for tension relieving means associated with conveyor B) has stopped and the motor M-1 (for driving conveyor B) is actuated thereby starting up conveyor A, and FIGURE 17 shows a solid-state control system which may be used instead of the circuit shown in FIGURE 5.

In the embodiments of the invention shown in FIGURES 1 and 7 a number of units 10 are disposed to form the endless conveyors A and B which are angularly related and have a coplanar area of intersection 16. In FIGURE 1 each conveyor is five units wide while in FIGURE 7 the width of a conveyor comprises only one unit.

As shown in FIGURE 2 each conveyor unit 10 has around its periphery four coupling members 18, 20, 22 and 24 spaced apart at 90° intervals. Two of the coupling members, 18 and 20, are elongated members, spaced from the unit by relatively thin webs $w$, and more or less cigar shaped with tapering ends, which are referred to herein as "pins," and two of them, 22 and 24, are sockets defined by open ended reentry grooves referred to hereafter as "grooves." Groove 22 is shown disposed directly opposite to, and parallel with, pin 18, and groove 24 is shown disposed directly opposite to, and parallel with, pin 20. The pins are slightly smaller in cross section than the diameter of the grooves to facilitate the entry of pins of one unit into the grooves respectively of adjacent units and their subsequent uncoupling. As will be clear by reference to FIGURES 3, 4 and 7, when a unit 10 is moved along a first path, past another, laterally disposed, stationary unit 10, a pin 18 or 20 of the moving unit will enter endwise into the groove 22 or 24 of the stationary unit, and will be fully inserted within the groove when the moving unit becomes fully aligned with the stationary unit in a plane normal to the axis of the pin and the groove, or the groove 22 or 24 will be moved over and around a pin 18 or 20 of the stationary unit. If the relative movement between the two units is then stopped, and a force is applied tending to move either of them in the direction of their alignment, the two units will be moved together along a second path, with the two units interengaged and entrained. The entrainment will be broken, and the two units decoupled, if movement of the units along the second path is stopped and either of the two units is moved, relative to the other, along said first path.

The coupling members 18 and 20 may be conveniently described as substantially T-shaped coupling members, each comprising a stem identified above as web $w$, and the top or cross bar identified above as a pin. The sockets 22 and 24 may be conveniently referred to as substantially tubular coupling portions.

Similarly if a unit 10 is moved laterally with respect to a unit in front of or behind it with which it is coupled, it will be automatically decoupled from said unit. Thus, as is very simply illustrated in the embodiment shown in FIGURE 7, if a unit 10 is moved along one path as part of conveyor A, to the area of intersection 16, and conveyor A is stopped when the unit is within the area of intersection, the said unit may be simultaneously detached from the now stationary units in front and behind it along the path of conveyor A, by actuating conveyor B. It will be noted that in the process of moving along the path of conveyor A onto the area of intersection 16 it will have become automatically coupled with the units 10 disposed on either side of the path of conveyor A (which are the units directly in front of it and behind it along the path of conveyor B), and so it will be entrained with said units for movement along the path of conveyor B. Thus a unit which arrived at the area of intersection 16 as part of conveyor A travelling along a first path, will leave the area of intersection as part of conveyor B travelling along a sceond path, which is angularly related to the first path, and any article or articles carried by the said unit will be moved with it around a corner.

Obviously, by reversing the order in which the conveyors are moved units, or rows of units, comprising conveyor B may be brought one by one to the area of intersection 16, and, when movement of conveyor B is stopped and movement of conveyor A commenced, the unit will be entrained with other units disposed along the path of conveyor A and will move in a new direction, angularly related to the path of conveyor B, as part of conveyor A.

In FIGURE 1 the units 10 are disposed to form two conveyors each five units in width. As shown only the upper flights of the conveyors intersect. Preferably the upper flights travel over, and are supported by, support means such for example as is indicated at 12 in FIGURES 8 and 9. The units are made small enough, and are interconnected in such a way, that they can travel around the rollers R–1 for conveyor A and R–2 for conveyor B, by the selective actuation of which varying combinations of units are made to move along one or another of two angularly related paths. To provide better contact between the belts and the rollers R–1 and R–2 respectively the rollers are preferably formed with a number of flat areas $f$ defining the outer surface. Preferably the length of a flat area corresponds substantially to the length of a unit 10.

At least one roller supporting each of the conveyors A and B is provided with separate driving means, and as is more fully explained in connection with FIGURE 5, only one of the two conveyors A and B can be made to travel at one time. An article to be conveyed may be loaded onto either conveyor A or B and that conveyor can then be moved until the unit or combination of units on which the article is resting is positioned within the area of intersection 16. Movement along one path may then be ended, and, by actuating the drive means for the other conveyor, the unit or block of units within the area of intersection, (which in the embodiment shown in FIGURE 1 comprises twenty-five units) may be decoupled from the units which have been in front and behind said block of units along the first path of movement and are disposed outside the area of intersection. Since the unit or block of units, as it moved into the area of intersection, became coupled to the stationary unit or units on the second path adjacent the area of intersection (on either side of the first path in the embodiment shown in FIGURE 1) the unit or block of units will now be entrained for movement with the units moving along the said second and angularly related path.

As shown in FIGURE 1 the drive for conveyor A is from motor M–1 through its shaft 26, pulley 28, belt 30, and pulley 32, which is fixed on an extended end of the axle 34 of roller R–1.

Similarly the drive for conveyor B is from motor M–2 through its shaft 36, pulley 38, belt 40 and pulley 42 which is fixed on the extended end of the axle 44 of roller R–2.

In FIGURE 5, a control system is shown for alternately actuating conveyor A or conveyor B and for regulating the stopping of the conveyors so that travel of the conveyors is mutually exclusive, and the component units 10 of either conveyor which is stationary will be either wholly within or outside of the area of intersection so there will be no impediment to advancing one conveyor after the other conveyor has been stopped.

The members 50 and 52 shown in FIGURE 5 may be the motors M–1 and M–2 indicated in FIGURE 1, in which case the circuit of FIGURE 5 would be suitable for controlling conveyors which were not required to travel particularly fast, and which were intended to carry a fairly light load. FIGURE 5 may therefore be described as an independent control system, but the circuit of FIGURE 5 also should be considered in association with FIGURE 14 in which case members 50 and 52 become relays and they are so shown in FIGURE 14. The circuit of FIGURE 14 provides means operative in timed relation to the throwing of the main switch 48 of the circuit of FIGURE 5 to start one of the conveyors, to nudge forward the unit or row of units of the other conveyor adjacent the area of intersection on one side. This action relieves any tension or binding between the said unit or row of units and the adjoining unit or row of units within the area of intersection and thus facilitates the uncoupling of the unit or units which are within the area of intersection from the adjacent unit or units of the conveyor of which they have been a part but which is now stationary, and readies them to move out of the area of intersection as part of the other conveyor, the movement of which has been called for by the new position of the main switch.

The control system shown schematically in FIGURE 5 comprises, at top and bottom, portions of two conveyors A and B, which may be parts of the conveyors shown in FIGURE 1 or parts of the conveyors shown in FIGURE 7. Mounted to be moved by the conveyors A or B respectively are the timing disks 54a and 54b, each of which has around its periphery some form of engagement, here shown as teeth $t$ adapted to engage in match recesses $r$ provided in the under surface of the units 10 comprising the conveyors. The size of disks 54a and 54b is proportioned relative to the length of units 10, and electrical switching means, to be described, ensure that the conveyors will not stop with any unit or row of units 10 straddling the area of intersection. As shown the circumference of disks 54a and 54b respectively is equal to the length of two intercoupled units 10. The midpoint of the links or units 10 of conveyor A are contacting disks 54a when the interface between the intercoupled edges of the links or units of conveyor B are passing over disks 54b.

Timing disk 54a is mounted on a shaft 60a which also supports the coaxially disposed disks 62a and 64a. When conveyor A moves disks 54a, 62a and 64a are all rotated in syncronism. Disk 62a has at its center a conductive ring 66a on which travels the contact brush 68a. Extending radially on disk 62a from the contact ring 66a to and over the periphery of disk 62a are the conductive strips 70a and 72a spaced 180° apart. A brush 74a rides on the periphery of disk 62a and a connection is thus made between ring 66a and brush 74a twice during a revolution of disk 62a. Disk 64a has around its periphery the conductive ring 76a which is broken by gap 78a equal in width to the width of strips 70a and 72a respectively. Brushes 80a and 82a are spaced apart 180° and ride on ring 76a.

Similarly timing disk 54b is mounted on shaft 60b which also supports the coaxially disposed disks 62b and 64b. When conveyor B moves disks 54b, 62b, and 64b, are all rotated in synchronism. Disk 62b has its center a conductive ring 66b on which travels the contact brush 68b. Extending radially on disk 62b, from the contact ring 66b, to and over the periphery of disk 62b, are the conductive strips 70b and 72b, spaced 180° apart so that a connection is made between ring 66b and brush 74b twice during a revolution of disk 62b. Disk 64b has around its periphery the conductive ring 76b which is broken by gap 78b, equal in width to the width of strips 70b and 72b respectively. Brushes 80b and 82b are spaced apart 180° and ride on ring 76b.

It will be noted that conductive strips 70a and 72a on disk 62a are 90° out of phase from the conductive strips 70b and 72b on disk 62b, and the gap 78a in conductive ring 76a on disk 64a is 90° out of phase with the gap 78b in conductive ring 76b on disk 64b.

The disks 62a and 64a and the disks 62b and 64b are connected within a circuit comprising the members 50 and 52 and the conveyor selector switch 48. As noted above members 50 and 52 may be the motors for driving the conveyors if the circuit of FIGURE 5 is used alone, or they may be relays if the circuits of FIGURES 5 and 14 are combined.

Power is supplied from the source 86 through lead 88 to the ring 76a of disk 64a through brush 80a which travels on ring 76a. From ring 76a and through brush 82a current flows through lead 83 to member 50 which is connected to ground by lead 51. Current is also supplied from the source through lead 88 and branch lead 89a to brush 74a which rides on the periphery of disk 62a where it will connect to the center ring contact 66a through conductive strip 70a or strip 72a twice during each revolution of disk 62a, and at the exact moment when the circuit through ring 76a is broken due to the passing of gap 78a under brush 80a or brush 82a. Thus, when the circuit to member 50 is broken, through ring 76a and brushes 80a and 82a, it is closed between brushes 74a and 68a through strips 70a or 72a on disk 62a. Brush 68a is connected to brush 74b, which rides on the periphery of disk 62b, by lead 92.

Brush 68b of disk 62b rides on the center ring contact 66b and is connected by lead 94 with the arm 95 of the three position switch 48. When arm 95 is on contact $a$ of switch 48 it is connected through lead 96 to lead 83 and thence to member 50. When conveyor A is moving switch arm 95 will remain on contact $a$ and conveyor B cannot move. While the switch arm 95 remains on contact $a$ the circuit to member 50 will be closed through disks 62a and 62b during the moments the circuit is broken through disk 64a as it is repeatedly each half rotation of disk 64a, which in linear travel of a conveyor is equal to the length of a unit 10. But when switch arm 95 is moved off contact $a$ of switch 48 the current to member 50 will be cut off as soon thereafter as the gap 78a in ring contact 76a moves into the alignment with either brush 80a or 82a. Since the distance between brushes 80a and 82a, around ring contact 76a is equal to the length of a unit 10 it will be seen that by initially positioning disks 64a and 62a as shown it will be possible to stop the conveyor only as distances equal the length of a unit 10 and with the line of coupling between units 10 or rows of units 10 exactly at the margin of the area of intersection.

When the switch arm is placed on contact $c$ of switch 48 to actuate conveyor B, conveyor A will be stationary, and the flow of current to member 52 is from the source 86, through disk 62a, and leads 92 and 89b to brush 80b, ring contact 76b on disk 64b, which is now revolving, brush 82b and lead 93, or, when the circuit through disk 64b is broken by gap 78b, the circuit is from disk 62a and lead 92 to brush 74b, the contact strip 70b or 72b, and the center ring contact 66b of disk 62b, which is now revolving, the brush 68b, lead 94, switch arm 95 through contact $c$ and leads 97 and 93 to member 52 and to ground.

In order to prevent frictional binding, between the coupling members of a unit 10 or block of units 10, within the area of intersection, and the coacting coupling members of a unit or row of units adjacent to, but outside of, the perimeter of the area of intersection, which might prevent successful transfer of the units or units within the area of intersection from one conveyor to the other, as for example when a heavy load is being conveyed, means are provided for nudging forward the unit or row of units of a conveyor which is nearest the area of intersection along one lateral margin when a conveyor is stopped. Such means is indicated in FIGURE 1 and is shown in more detail in FIGURES 8 and 9. It is only necessary to move a unit or row of units a small distance, within the range of tolerance between coacting coupling members.

The tension relieving action may be applied to the unit or units of a conveyor which is nearest the area of intersection along one lateral margin, or by separate means disposed on both sides of the area of intersection, which may be desirable especially if the travel of the conveyors is reversible.

In the embodiment of the invention illustrated herein the tension relieving force is applied to a unit or row of units of one conveyor immediately after the three position main switch 48 has been set to start the other conveyor.

In FIGURES 8 and 9 a conveyor A or B is shown which in cross section comprises five units 10 each of which has on its under surface a recess 104 to receive, through openings in the table 12, a projection 102 extending upwardly from the top of a three sided rake 100 which is disposed transversely of the conveyor and is mounted eccentrically on disks 106, to move up into engagement with a unit or row of units 10 of the conveyor, then forwardly to advance the unit or row or units enough to relieve tension between said unit or row of units and the unit or units ahead of them to which they are coupled, and then downwardly out of engagement with the units 10 and back to starting position. The disks 106 are mounted on a shaft 108 and are rotated by motor M–3 or M–4, belt 110 extending around a pulley 112 on the motor shaft and a pulley 114 on the shaft 108. The end members of the three sided rake are reciprocal within the rotatable guide members 116 which are interconnected by shaft 118 which is mounted on the slide members 120 which are in turn mounted for movement up and down on the guideways 122 provided by the support members 124. The throw of the eccentric lifts the rake 100 vertically causing the teeth 102 to enter the recesses 104 of those units 10 which are adjacent to the perimeter of the area of intersection and to move them forward sufficiently to prevent frictional binding between the coupling members of those units and the adjacent units 10 which are within the area of intersection. The amount of forward movement is adjustable by the positioning of slide members 120 and guide members 116.

In FIGURES 14 the leads 83 and 98 are the leads identified by the same numerals in FIGURE 5, and members 50 and 52 are cycling relays instead of motors. The result accomplished by the circuit shown in FIGURE 14 is to delay the starting of one conveyor, after the main switch 48 has been closed to start that conveyor, until the tension relieving means of the other conveyor, described above, has operated, thus relieving any binding between the unit or units 10 within the area of intersection and the adjoining units of the other conveyor which are outside the area of intersection, and thus freeing the unit or units which are within the area of intersection to move out of said area as part of the conveyor being actuated.

Control means 130 and 132 are shown for monitoring the tension relieving means for each of the conveyors respectively in timed relation to the closing of the switch 48 to actuate movement of the other conveyor. Means 133 for reversing the direction of a conveyor is indicated. Since the control means associated with each of the conveyors is essentially the same, it is described in detail only in connection with the means associated with one conveyor. It will be understood that the means shown in the boxed area indicated as X, for motors M–4 and M–1, will be repeated in the area indicated as Y for motors M–3 and M–2.

Three stages for the operation of the nudging means for one conveyor (conveyor B) are shown in FIGURES 14, 15 and 16 respectively. The timing cams 135, 136 and 137 are shown mounted on the same shaft 108 with the disks 106 to which the lower ends of the end arms of rake 100 are eccentrically mounted, and these figures show how the high and low surface areas of the cams control the position of the switch arms of switches 144, 150 and 164.

Current for the rake control means is supplied from the supply 138. When relay 50 is energized to put conveyor A in motion, (by placing switch arm 95 on contact a of switch 48) current flows from the source of supply 138 through lead 140 to the lower contact 142 of switch 144, the arm of which is controlled by cam 136, and through lead 146 and the lower contact 148 of switch 150 the arm of which is controlled by the cam 135, and through lead 152 to the relay arm 154, and through the relay contact 156 and lead 158 to the motor M–4 which drives the disks 106 on which the rake 100 is eccentrically mounted. Motor M–4 starts and the cams 135, 136 and 137 as well as the disks 106 are rotated to the position shown in FIGURE 15 and the current path becomes, from the source 138, through lead 140 to the upper contact 143 of switch 144, and through lead 160 and the upper contact 149 of switch 150, and the lead 162 to the motor M–4.

When member 100 for nudging and holding conveyor B is in top position the member 100 for conveyor A is in bottom position. While the cams 135, 136 and 137 for nudging and holding conveyor B are moving from the position shown in FIGURE 14 to the position shown in FIGURE 16, the rake moves up from its lowest position and the projections 102 enter the concavities 104 in the bottom of the opposed unit or row of units of the conveyor B, and swing forwardly and move the conveyor unit or row of units in the direction of the arrow sufficiently to relieve any tension between the couplings of those units and the adjacent units on the opposite side of the margin of the area of intersection. The contact arm of switch 144 has now returned to the contact 142, breaking the circuit to motor M–4 which now stops, leaving the projections 102 of the rake inserted within the concavities 104 in the lower surface of the belt. When relay 52 is energized to put conveyor B in motion relay 50 drops and the rake holding conveyor B moves B down again to the position shown in FIGURE 14.

When the cams reach the positions shown in FIGURE 16 the position of cam 137 causes switch 164 to close, and current flows through lead 166 to the contact 168 of the relay 50 which is energized, causing the motor relay 50a to be energized from source 86 and starting motor M–1 which drives conveyor A.

The form of conveyor unit shown in FIGURE 11 comprises four sub-units 170 each provided along two edges with the eye members 172. The members 172 projecting from two edges of a sub unit 170 are staggered with relation to the members 172 extending from the opposed edges of adjoining sub-units, and the eyes of both sets of sub-units 170 are interconnected by means of pins 174 inserted through the aligned eyes, thus providing a unit 10 which is flexible along two angularly disposed hinge lines. With this construction a larger unit may be made to pass around a supporting and driving roller.

FIGURES 5 and 14 show electro-mechanical means for controlling the stopping of the conveyors only at predetermined positions and for operating means for relieving tension between couplings along the margins of the area of intersection of the conveyors. In FIGURE 17 preferred control means is shown comprising solid-state circuitry.

In FIGURE 17 there is shown a system involving solid-state circuitry for controlling the position in which conveyors A and B stop to insure all units 10 will be either wholly within or wholly outside of the area of intersection 16. The system of FIGURE 17 is preferred over the electro-mechanical system of FIGURE 5, for controlling conveyors travelling at high speed.

Two light sources LA and LB are positioned to direct light at the respective conveyors and throw light on the photo cells PA–1 and PB–1 through the spaces between successive units or rows of units 10 where the adjacent units or rows of units are coupled. Light reaches the photo cells PA–1 and PB–1 only when the spaces between the links are in an aligned position between the light sources and the photo cells PA–1 and PB–1 respectively. Beyond the conveyors from the light sources, but between the light sources and the photo cells PA–1 and PB–1 respectively, the members IA and IB are provided, each of which has a small central opening for the passage of light. Members IA and IB each serves as an iris to occlude stray light but to permit light from LA and LB to reach photo cells PA–1 and PB–1 respectively when a space between the links or units 10 of conveyor A or B is directly aligned between the light source and the corresponding photo cell.

Light from the light sources LA and LB falls continually on the photo cells PA–2 and PB–2, which are provided to monitor the light sources and give notice if either light source fails for any reason. This makes it possible to distinguish between a situation, where the light from a light source LA or LB does not reach its corresponding photo cell PA-1 or PB-1 because a space between adjacent units of conveyor A or B is not aligned between a light source and its responsive photo cell, and a situation which would prevail if a light source failed. While a light source LA or LB is giving light photo cells PA-2 or PB-2 transmit a signal (MSA or MSB) to amplifiers A2 or B2, and the OR gate remains inoperative. In the event of lamp failure the affected photo cell, PA-2 or PB-2, discontinues signals to amplifier A-2 or B-2 respectively, and the discontinuance of the signals will operate the gate circuit which then operates through SC, cut off sub-circuits CA, CB and CP simultaneously, thereby terminating the operation of both conveyors.

On receiving light between the links of a conveyor the photo cells PA-1 or PB-1 cause amplifiers A-1 or B-1 to transmit an amplified signal, (ASA or ASB), through sub-circuit CA or sub-circuit CB, to switching sub-circuit S1A or S1B as the case may be. Upon receiving a signal from its amplifier A-1 or B-1 switching sub-circuit S1A or S1B provides a conducting path from its terminal 1 to its terminal 2. In the absence of a signal these switching sub-circuits S1A or S1B provide a conducting path from terminal 1 to terminal 3.

Terminal 2 of switching sub-circuit S1A is connected to terminal 1 of sub-switching circuit S1B; terminal 2 of switching sub-circuit S1B is connected to the arm of switch 248M which is part of the double control switch 248M–248N, which is manually operated to start and stop the conveyors alternatively. The switch arm of switch 248N moves with the switch arm of switch 248M. The portion 248M of switch 248M–248N has five positions and four contacts. Reading from the top, counter-clockwise, are contacts $a'$ and $a$, $b$, which is the "off" position, and contacts $c$ and $c'$. It will be noted that contacts $a$ and $a'$ are interconnected and that contacts $c$ and $c'$ are interconnected.

Contacts $a$–$a'$ of switch 248M are connected through lead 296 to terminal 3 of switching sub-circuit S1A, and through lead 283 to switching sub-circuit S2A (which corresponds to member 50 in the circuit of FIGURE 5). Contacts $c$–$c'$ of switch 248M are connected by lead 297 to terminal 3 of switching sub-circuit S1B, and by lead 293 to switching sub-circuit 52B (which corresponds to member 52 in the circuit of FIGURE 5). The terminals S2A and S2B are connected to the normally closed contacts of the time delay circuits TDA and TDB respectively, which may be of known kind, which in turn are connected to the three-phase control circuits MCSA and MCSB for causing motor MA or motor MB to drive conveyor A or B at slow speed.

When the switch arms of 248M–248N are at either position $a$ or $a'$ conveyor A will be caused to move at a slow rate of speed. If the switch arms are at position $a$ conveyor A will continue to move at slow speed, but, if the switch arms are placed in position $a'$ connection will be made through switch 248N to the relay coil of time delay circuit TDA and when the time delay has expired its contacts will transfer and conveyor A will be moved at full or normal speed. Similarly positioning the switch arms in positions $c$ or $c'$ will cause conveyor B to move at slow or normal (full) speed.

The switching circuits S2A and S2B are of the same type as the switching circuits S1A and S1B. Upon receiving a signal through leads 283 or 293 these circuits provide a conducting path from terminal 1 to terminal 2. In the absence of a signal the path is from terminal 1 to terminal 3 which is not used in this case. The output of circuits S2A and S2B, indicated as OA or OB, are fed through the normally closed contacts NCA or NCB of the time delay relay circuits TDA or TDB respectively, to actuate conveyor motors MA or MB, through the motor control circuit MCSA or MCSB.

When the control arms of the double switch 248M–248N are thrown to position $a'$ for operating conveyor A, or to position $c'$ for operating conveyor B, the selected time delay relay will energize and after its pre-set delay has expired it will transfer to supply current to the motor control circuits MCNA or MCNB which provide current paths to operate the respective conveyor motors MA or MB at "normal" conveyor speed.

When the switch arms are moved from position $a'$ or $c'$ the corresponding time delay relay will be deenergized, thereby actuating circuit MCSA or MCSB, and enabling the monitoring sub-circuit S1A or S1B to perform its function at low conveyor speed until the conveyor units 10 of conveyor A or conveyor B, are disposed wholly within or wholly outside of the area of intersection.

If, when the arms of switch 248M–248N are placed to start either conveyor, at "slow" or "normal" speed, the other conveyor should have been accidentally moved so that light from its controlling light source cannot reach its photo cell PA1 or PB1, and therefore the path through the sub-circuit S1$a$ or S1$b$ is from terminal 1 to terminal 3, the corresponding sub-circuit S2A or S2B is triggered making a conducting path from its terminal 1 to terminal 3, and causing the non-aligned conveyor to move the short distance required to position it properly, with all its links or units 10 disposed wholly within or wholly outside of the area of intersection 16.

A time delay sub-circuit TDC is provided between terminal 2 of S1B and the switch arm of switch 248M to insure a substantially stable condition at the switch arm of switch 248M. This sub-circuit will provide a conducting path only after a steady signal has been applied for a predetermined length of time determined by sub-circuit component values.

There has thus been provided a system in which the objects stated above are achieved in a thoroughly practical way.

In the claims:

1. A material handling system comprising a number of units disposed in columns along two endless intersecting paths disposed along two vertically spaced planes, the unit or units momentarily occupying the area of intersection being common to both paths, and means for selectively advancing in either direction the unit or units disposed along one or the other of said paths including the unit or units disposed within the common area of intersection.

2. The system claimed in claim 1 comprising a number of conveyor units disposed along two angularly related paths to define two conveyors having a coplanar area of intersection and means for interchanging units between said conveyors at the area of intersection for travel alternatively along said paths.

3. The system claimed in claim 1 comprising two angularly related, alternatively movable conveyors having a common coplanar area of intersection, the unit or units which are within said area of intersection being common to both conveyors and being movable from said area of intersection as part of whichever of said conveyors is moved while the other remains stationary, and means for selectively moving said conveyors.

4. The system claimed in claim 1 in which the units which at any moment occupy the area of intersection are intercoupled with adjacent units along both paths and are movable along either of said paths with the other units disposed along the path and by such movement are decoupled from the units on either side of the path of movement.

5. The method of transporting an article along a first path and then along a second path angularly related to the first path, which comprises forming two angularly related endless conveyors, having a coplanar area of intersection, from conveyor units which are engageable for movement together in either direction along one path and disengageable for relative lateral movement, and transferring one or more units, on which the article is resting, from one conveyor to the other at said area of intersection.

6. A conveying system comprising a number of units defining an endless conveyor having two flights vertically spaced apart and aligned in the same plane each unit having coupling means coactive with coupling means carried by the longitudinally adjoining units in said column providing positive engagement for moving the units together in either direction along one path and permitting movement of one unit laterally relative to the other units.

7. The system claimed in claim 6 in which the coacting coupling means are such that a moving unit becomes coupled with a stationary laterally disposed unit preparatory to moving with said unit in either direction in a column angularly disposed with respect to said first mentioned column.

8. A material handling system comprising a number of units disposed in columns defining two endless conveyors having upper and lower flights with at least a portion of one flight of both conveyors being disposed in the same horizontal plane and intersecting, said units being engageable along two sides with other units comprising one of said endless conveyors, and engageable along two other sides with units comprising the other of said endless conveyors, and means for selectively moving in either direction the units comprising one or the other of said conveyors, the unit or block of units which at any time occupies the intersecting area being common to both conveyor members and being movable with, and forming part of, whichever of said endless conveyors is moving.

9. A material handling system comprising a number of units disposed in columns along two intersecting paths, the unit or units momentarily occupying the area of intersection being common to both paths, and means for selectively advancing in either direction the unit or units disposed along one or the other of said paths including the unit or units disposed within the common area of intersection, the individual units being provided with coupling means adapted to interengage with coacting coupling means carried by the adjacent units, the coupling means being such that units which are moving engage and disengage coacting coupling means carried by adjacent laterally disposed units which are not moving while remaining coupled to adjacent units disposed in front or behind.

10. The method of transporting an article which comprises disposing a number of conveyor forming units along two endless, angularly related paths having a coplanar area of intersection in common, forming two alternatively movable conveyors by interconnecting the units by means providing interengagement between units disposed in column along said paths, and providing coupling and decoupling between units which are moving along one path and adjacent laterally disposed units which are stationary along the other path, and supporting the article on one or more of said units while moving said units along one of said paths as part of one of said conveyors, and then moving the units along the other of said paths as part of the other of said conveyors.

11. A material handling system comprising a number of units disposed to form two angularly related, alternatively movable conveyors having a common coplanar area of intersection, the unit or units which are within said area of intersection being common to both conveyors and being movable from said area of intersection as part of whichever of said conveyors is moved while the other remains stationary, and means for selectively moving said conveyors, and monitoring means for controlling the travel of a moving conveyor to stop it only in a position in which the units comprising the conveyor are either wholly within or wholly outside of the area of intersection.

12. A material handling system comprising a number of units disposed in columns comprising two angularly related, alternatively movable conveyors having a common coplanar area of intersection, the unit or units which are within said area of intersection being common to both conveyors and being movable from said area of intersection as part of whichever of said conveyors is moved while the other remains stationary, and means for selectively moving said conveyors, each conveyor unit comprising a body portion, and a plurality of pin coupling members and a plurality of socket defining coupling members disposed around the periphery of the body portion.

13. A material handling system comprising a number of units disposed in columns along two intersecting paths, the unit or units momentarily occupying the area of intersection being common to both paths, and means for selectively advancing the unit or units disposed along one or the other of said paths including the unit or units disposed within the common area of intersection, the units which at any moment occupy the area of intersection being intercoupled with adjacent units along both paths and movable along either of said paths with the other units disposed along the path and being by such movement decoupled from the units on either side of the path of movement, and means projectible into engagement with a unit or row of units disposed just outside the area of intersection to move the unit or row of units a very small distance within the range of tolerance between coacting coupling members, and means operable in timed relation to the advance and stopping of said unit or row of units to relieve tension between unit intercouplings along one side of the area of intersection.

14. A material handling system comprising a number of units disposed in columns comprising two angularly related, alternatively movable conveyors having a common coplanar area of intersection, the unit or units which are within said area of intersection being common to both conveyors and being movable from said area of intersection as part of whichever of said conveyors is moved while the other remains stationary, and means for selectively moving said conveyors, each conveyor unit comprising a body portion, and a plurality of substantially tubular coupling member portions, and a plurality of substantially T-shaped coupling member portions disposed around the periphery of the body portion, the substantially tubular coupling portions of one unit being opposed to the substantially T-shaped coupling portions of adjacent units, the substantially tubular portions being partially open on their outer faces providing slots through which the stem of the opposed T-shaped portions extend, the top or cross bar of the T-shaped portions being slideable within the opposed substantially tubular portion and of a size such that it cannot pass through the slot defined by the substantially tubular portion.

References Cited

UNITED STATES PATENTS 1,101,567   6/1914   Ridgway _____ 273—153 X

FOREIGN PATENTS 236,616   7/1925   Great Britain.

EDWARD A. SROKA, *Primary Examiner.*